United States Patent
Zhang

(10) Patent No.: US 11,778,304 B2
(45) Date of Patent: Oct. 3, 2023

(54) SHOOTING METHOD AND TERMINAL

(71) Applicant: VIVO MOBILE COMMUNICATION CO., LTD., Guangdong (CN)

(72) Inventor: Hong Zhang, Chang'an Dongguan (CN)

(73) Assignee: VIVO MOBILE COMMUNICATION CO., LTD., Chang'An Dongguan (CN)

( * ) Notice: Subject to any disclaimer, the term of this patent is extended or adjusted under 35 U.S.C. 154(b) by 17 days.

(21) Appl. No.: 17/538,623

(22) Filed: Nov. 30, 2021

(65) Prior Publication Data

US 2022/0086336 A1 Mar. 17, 2022

Related U.S. Application Data

(63) Continuation of application No. PCT/CN2020/092012, filed on May 25, 2020.

(30) Foreign Application Priority Data

May 31, 2019 (CN) .......................... 201910467866.6

(51) Int. Cl.
| | |
|---|---|
| H04N 23/611 | (2023.01) |
| H04N 5/265 | (2006.01) |
| H04N 23/90 | (2023.01) |
| H04N 23/63 | (2023.01) |
| H04N 23/695 | (2023.01) |

(52) U.S. Cl.
CPC .......... *H04N 23/611* (2023.01); *H04N 5/265* (2013.01); *H04N 23/632* (2023.01); *H04N 23/695* (2023.01); *H04N 23/90* (2023.01)

(58) Field of Classification Search
CPC combination set(s) only.
See application file for complete search history.

(56) References Cited

U.S. PATENT DOCUMENTS

| | | | | |
|---|---|---|---|---|
| 2010/0014721 | A1* | 1/2010 | Steinberg | G06F 16/583 |
| | | | | 382/118 |
| 2010/0111408 | A1 | 5/2010 | Matsuhira et al. | |
| 2012/0013759 | A1 | 1/2012 | Chen | |

(Continued)

FOREIGN PATENT DOCUMENTS

| | | |
|---|---|---|
| CN | 102207674 A | 10/2011 |
| CN | 104574397 A | 4/2015 |

(Continued)

OTHER PUBLICATIONS

European Search Report in Application No. 20814812.2 dated Jun. 30, 2022.

(Continued)

*Primary Examiner* — Mekonnen D Dagnew
(74) *Attorney, Agent, or Firm* — Maschoff Brennan

(57) ABSTRACT

A shooting method and a terminal are provided. The method includes: receiving a first input performed by a user for M face images; in response to the first input, controlling a rotatable target camera to rotate and collect an image; performing facial recognition in a rotation process of the target camera; and performing at least one shooting operation and outputting at least one target image that includes M target persons, where each target person corresponds to one face image, and M is a positive integer greater than 1.

14 Claims, 10 Drawing Sheets

(56) References Cited

U.S. PATENT DOCUMENTS

| | | | |
|---|---|---|---|
| 2015/0105123 A1 | 4/2015 | Song et al. | |
| 2017/0155849 A1 | 6/2017 | Qin et al. | |
| 2018/0041692 A1* | 2/2018 | Qin | H04N 23/687 |
| 2018/0152627 A1* | 5/2018 | Bostick | H04N 23/611 |

FOREIGN PATENT DOCUMENTS

| | | |
|---|---|---|
| CN | 104754231 A | 7/2015 |
| CN | 105391939 A | 3/2016 |
| CN | 105704389 A | 6/2016 |
| CN | 107703962 A | 2/2018 |
| CN | 107786812 A | 3/2018 |
| CN | 107835376 A | 3/2018 |
| CN | 108495045 A | 9/2018 |
| CN | 108668072 A | 10/2018 |
| CN | 108769514 A | 11/2018 |
| CN | 108933899 A | 12/2018 |
| CN | 109547696 A | 3/2019 |
| CN | 110062171 A | 7/2019 |
| WO | 2011016322 A1 | 2/2011 |

OTHER PUBLICATIONS

CN Office Action in Application No. 201910467866.6 dated Jun. 8, 2020.
CN Office Action in Application No. 201910467866.6 dated Jan. 20, 2021.
Written Opinion and International Search Report in Application No. PCT/CN2020/092012 dated Dec. 9, 2021.

* cited by examiner

SHOOTING METHOD AND TERMINAL

CROSS-REFERENCE TO RELATED APPLICATIONS

This application is a continuation application of International Application No. PCT/CN2020/092012 filed on May 25, 2020, which claims priority to Chinese Patent Application No. 201910467866.6, filed on May 31, 2019 in China, which are incorporated herein by reference in their entireties.

TECHNICAL FIELD

Embodiments of the present disclosure relate to the field of communications technologies, and in particular, to a shooting method and a terminal.

BACKGROUND

With increasingly wide application of terminals, terminal-based shooting is increasingly common. A user can shoot at any time via a terminal.

At present, when a user uses a camera to take a group photo of a plurality of persons, these persons need to be displayed in a preview interface of the camera at the same time; or the user needs to manually take photos of different target objects (for example, persons) separately, and then synthesize the photos according to an image synthesis algorithm, thereby obtaining the group photo of the plurality of persons. If there are a plurality of target objects, and the target objects are at different locations, the user needs to adjust a shooting angle for multiple times to shoot the target objects, obtain images via shooting, and finally perform image synthesis. The whole process is cumbersome and inefficient.

SUMMARY

Embodiments of the present disclosure provide a shooting method and a terminal.

According to a first aspect, an embodiment of the present disclosure provides a shooting method, applied to a terminal and including:
receiving a first input performed by a user for M face images;
in response to the first input, controlling a rotatable target camera to rotate and collect an image;
performing facial recognition in a rotation process of the target camera; and performing at least one shooting operation and outputting at least one target image that includes M target persons, where each target person corresponds to one face image, and
M is a positive integer greater than 1.

According to a second aspect, an embodiment of the present disclosure further provides a terminal, including:
a receiving module, configured to receive a first input performed by a user for M face images;
a response module, configured to: in response to the first input, control a rotatable target camera to rotate and collect an image;
a recognition module, configured to perform facial recognition in a rotation process of the target camera; and
an output module, configured to perform at least one shooting operation and output at least one target image that includes M target persons, where each target person corresponds to one face image, and
M is a positive integer greater than 1.

According to a third aspect, an embodiment of the present disclosure further provides a terminal, including a processor, a memory, and a computer program stored in the memory and executable on the processor, where when executed by the processor, the computer program implements the steps of the foregoing shooting method.

According to a fourth aspect, an embodiment of the present disclosure further provides a computer-readable storage medium, where the computer-readable storage medium stores a computer program, and when executed by the processor, the computer program implements the steps of the foregoing shooting method.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

Figure 1:
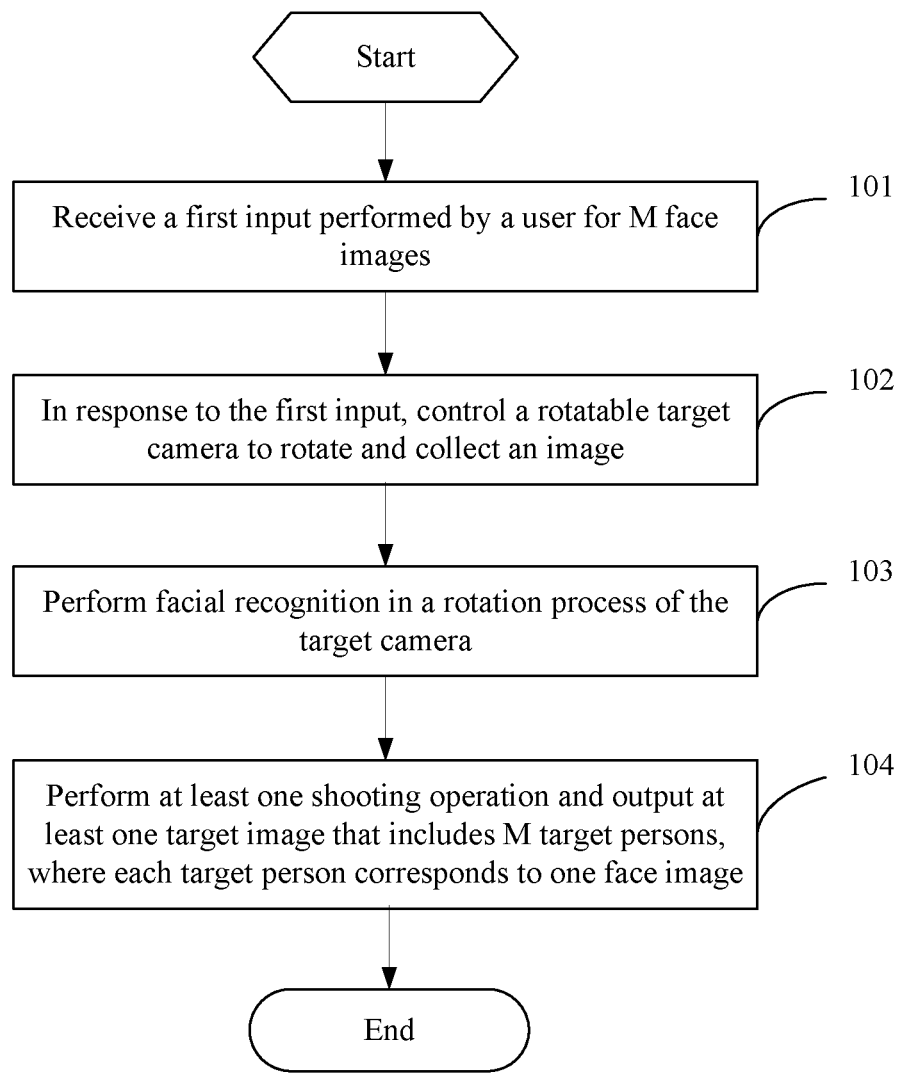
FIG. 1 is a first flowchart of a shooting method according to an embodiment of the present disclosure.

FIG. 1 is a first flowchart of a shooting method according to an embodiment of the present invention. As shown in FIG. 1, an embodiment of the present disclosure provides a shooting method. The shooting method is applied to a terminal and includes the following steps:

Step 101: Receive a first input performed by a user for M face images, where M is a positive integer greater than 1.

In this step, the first input is an input of selecting a face image. The user can select an image stored locally on the terminal or select an image on a network, for example, select an image in an album or select an image on the network.

The user can also select an image in a preview screen obtained via a target camera. For example, the first input is an input of clicking a face area in the preview screen.

Step 102: In response to the first input, control a rotatable target camera to rotate and collect an image.

After determining the face image based on the first input, the terminal controls the target camera to rotate and start to collect the image. The target camera is a camera that can rotate by a preset angle. The preset angle may be set according to actual conditions. For example, the preset angle may be set to 180 degrees, 360 degrees, or the like.

Step 103: Perform facial recognition in a rotation process of the target camera.

In the rotation process of the target camera, the terminal performs facial recognition on a face collected by the target camera. When performing facial recognition, the terminal compares the collected face with a face in the M face images to determine whether the collected face matches the face in the M face images.

Step 104: Perform at least one shooting operation and output at least one target image that includes M target persons, where each target person corresponds to one face image.

In a case that the image collected by the target camera includes the M target persons, the terminal can obtain a target image that includes the M target persons only by performing one shooting operation. In a case that the image collected by the target camera does not include the M target persons, the target camera needs to perform a plurality of shooting operations and synthesize images obtained in the plurality of shooting operations to obtain a target image that includes the M target persons.

The M target persons may be included in one target image or in a plurality of target images. For example, in a case that there are four target persons, a first target image may include a first target person and a second target person; and a second target image may include a third target person and a fourth target person. Alternatively, a first target image may include a first target person, a second target person, and a third target person; and a second target image may include the third target person and a fourth target person. Each target person corresponds to one face image of the M face images, that is, each of the M target persons has a one-to-one correspondence with a face image of the M face images.

The shooting method in this embodiment of the present disclosure includes: receiving the first input performed by the user for the M face images; in response to the first input, controlling the rotatable target camera to rotate and collect the image; performing facial recognition in the rotation process of the target camera; and performing the at least one shooting operation, and outputting the at least one target image that includes the M target persons, where each target person corresponds to one face image, and M is a positive integer greater than 1. In this way, after determining the M face images based on the first input performed by the user, the terminal uses the target camera to perform facial recognition on the collected image and perform shooting, to obtain the at least one target image that includes the M target persons. In the entire process, the user needs only to determine the M face images via the first input, which simplifies the user's operation and improves the efficiency of taking a group photo.

Figure 2:
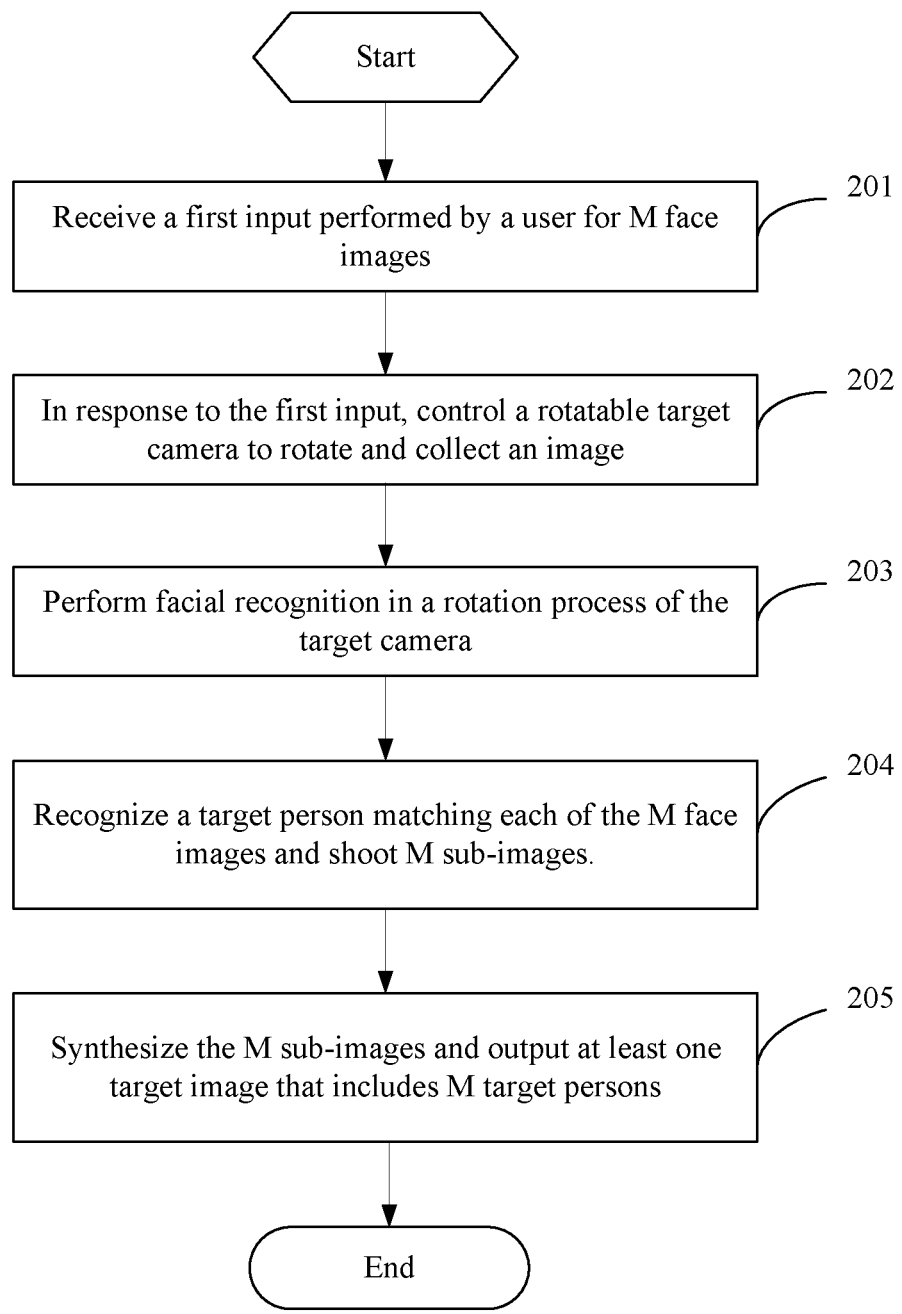
FIG. 2 is a second flowchart of a shooting method according to an embodiment of the present disclosure.

FIG. 2 is a second flowchart of a shooting method according to an embodiment of the present invention. As shown in FIG. 2, the method includes the following steps:

Step 201: Receive a first input performed by a user for M face images, where M is a positive integer greater than 1.

In this step, the first input is an input of selecting a face image. The user can select an image stored locally on the terminal or select an image on a network, for example, select an image in an album or select an image on the network.

The user can also select an image in a preview screen obtained via a target camera. For example, the first input is an input of clicking a face area in the preview screen.

Optionally, before the receiving a first input performed by a user for M face images, the method further includes:

in the rotation process of the target camera, shooting Q face images and recording orientation information corresponding to each face image; and the receiving a first input performed by a user for M face images includes:

receiving a first input performed by the user for a face image of the Q face images, where M is less than or equal to Q.

In this embodiment, in the rotation process of the target camera, the terminal performs facial recognition on the image collected by the target camera, and displays the Q face images obtained via facial recognition on a display interface of the terminal for selection by the user. The user can select the M face images from the Q face images, so that the terminal can obtain the target image based on the M face images.

The terminal performs facial recognition on the image collected by the target camera, and displays the Q face images obtained via facial recognition for selection by the user. The user needs only to select a face image via the first input to obtain a target image matching the selected image, that is, a group photo image. The whole process is simple to operate, which improves efficiency of obtaining a group photo image.

Figure 2A:
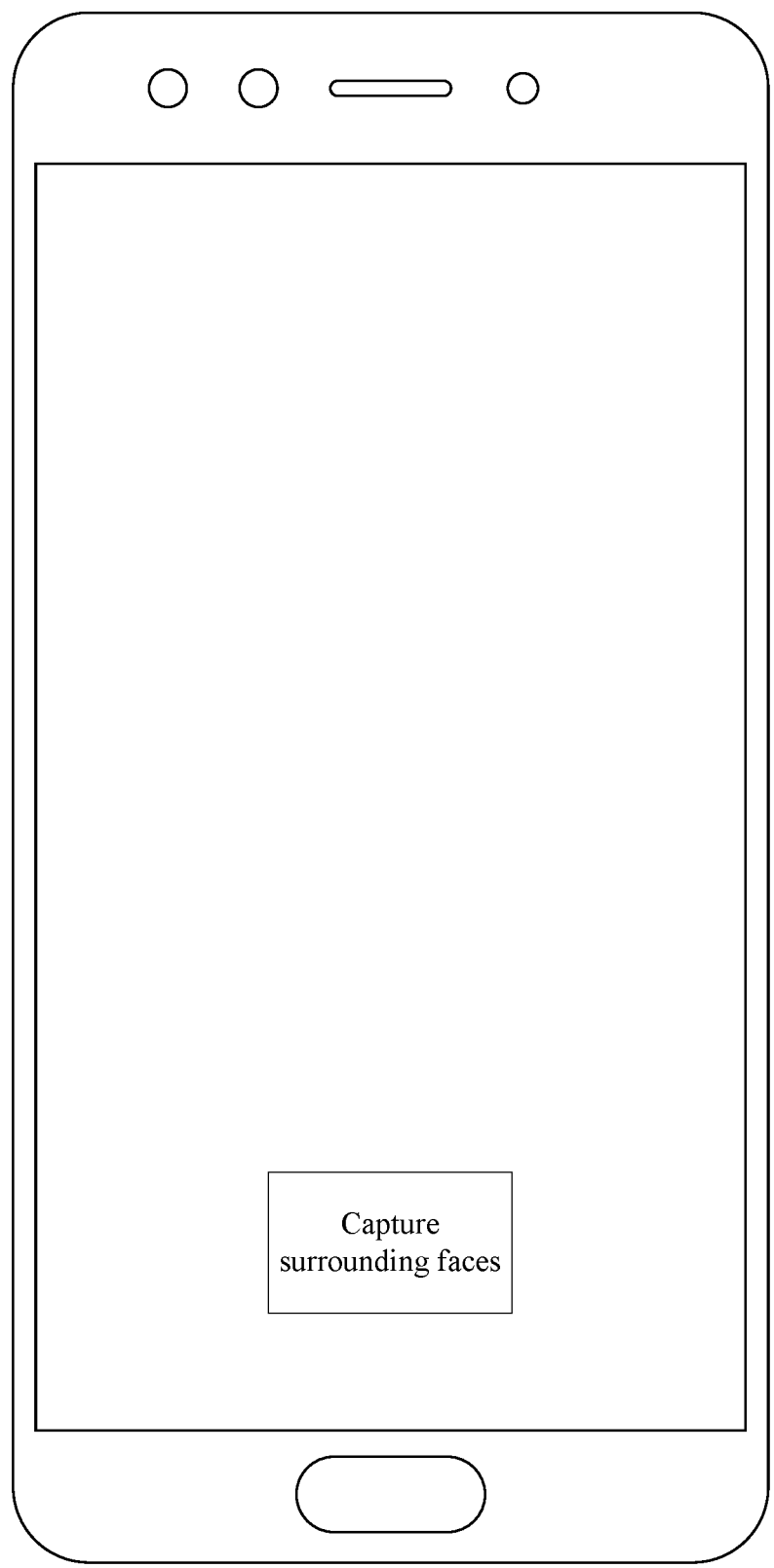
FIG. 2a to FIG. 2g are schematic diagrams of a terminal according to an embodiment of the present disclosure.
Figure 2B:
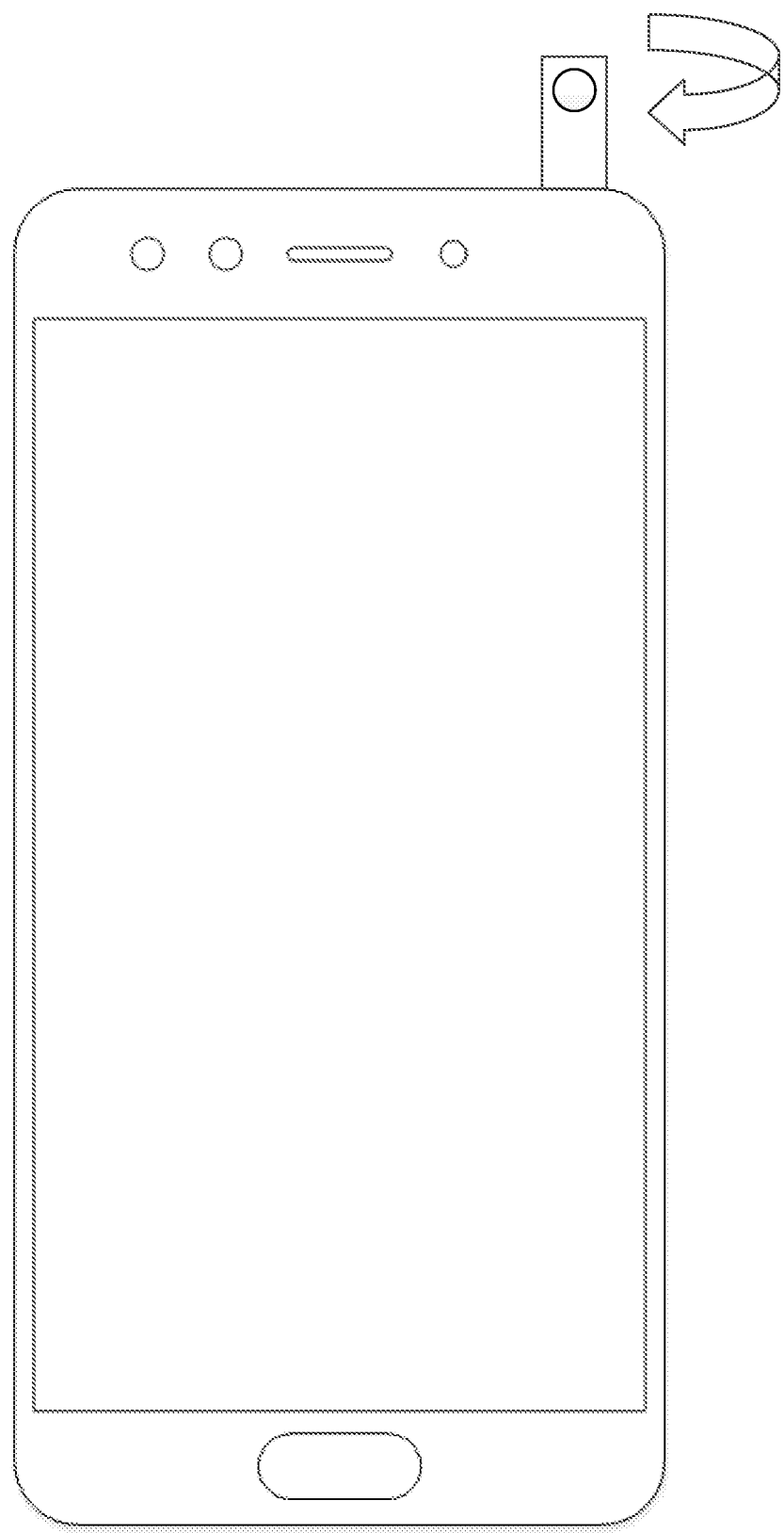
Figure 2C:

As shown in FIG. 2*a*, the user enables a function of capturing surrounding faces, for example, clicking a button for capturing surrounding faces on a display interface of the terminal. After the button "Capture surrounding faces" is clicked, the camera protrudes from the inside of the terminal and starts to rotate, for example, rotate by 360 degrees. As shown in FIG. 2*b*, a direction of an arrow in the figure is a rotation direction of the camera. In the rotation process of the camera, the terminal uses a facial recognition technology to recognize all faces collected by the camera, and record the faces. Then, the terminal displays the obtained face images on the display interface. For example, the terminal places each recognized face in a rectangular box and displays them on the display interface. As shown in FIG. 2*c*, in a case that obtained face images are too many to be displayed on the display interface at the same time, a sliding bar may be used for displaying; and the user can select a face image by clicking an area where the face image is located.

Optionally, the receiving a first input performed by a user for M face images includes:

receiving I inputs performed by the user for the M face images, where an $i^{th}$ input is used to determine j face images, I is a positive integer, i is a positive integer not greater than I, and j is a positive integer greater than 1 and not greater than M.

Specifically, the first input may include a plurality of inputs, that is, the M face images may be determined via a plurality of inputs. For example, a $1^{st}$ input determines two face images, and a $2^{nd}$ input determines three face images. Owning to different input sequences, the M face images can be divided into a plurality of groups, so that a plurality of target images are obtained. For example, sub-images obtained from face images in a same group are synthesized to obtain a target image.

Optionally, after the receiving I inputs performed by the user for the M face images, the method further includes:

for the $i^{th}$ input, displaying a corresponding identifier on each of the j face images or preset side edges of the j face images, where input features and corresponding identifiers of different inputs are all different.

Specifically, for face images selected via a same input, an identifier corresponding to the input is displayed on the face images or on preset side edges of the face images. For example, the identifier corresponding to the input is displayed on the left, right, upper, or lower sides of the face images. The identifier may be represented by a number, a color, or another mark, and is not limited herein. Face images determined via a same input have same identifiers. Face images determined via different inputs have different identifiers. Whether inputs are a same input or different inputs can be distinguished based on input features of the inputs.

Figure 2D:
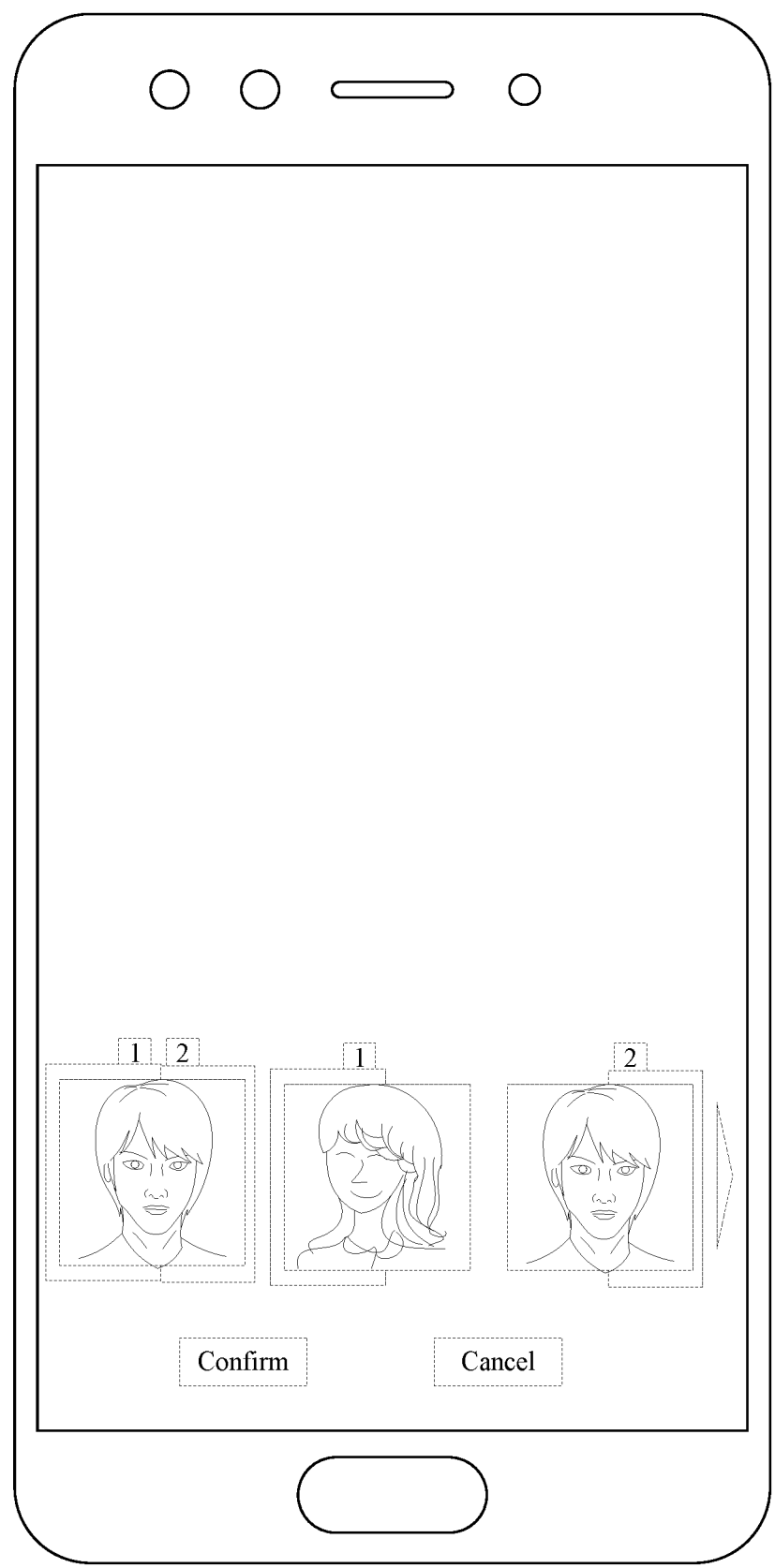

The user can distinguish between different selection inputs by clicking a left side and a right side of a face image. For example, an input of clicking the left side of the face image is determined as the $1^{st}$ input, and the input of clicking the right side of the face image is determined as the $2^{nd}$ input. As shown in FIG. 2d, an image marked with 1 is a face image determined via the $1^{st}$ input; and an image marked with 2 is a face image determined via the $2^{nd}$ input.

Figure 2E:
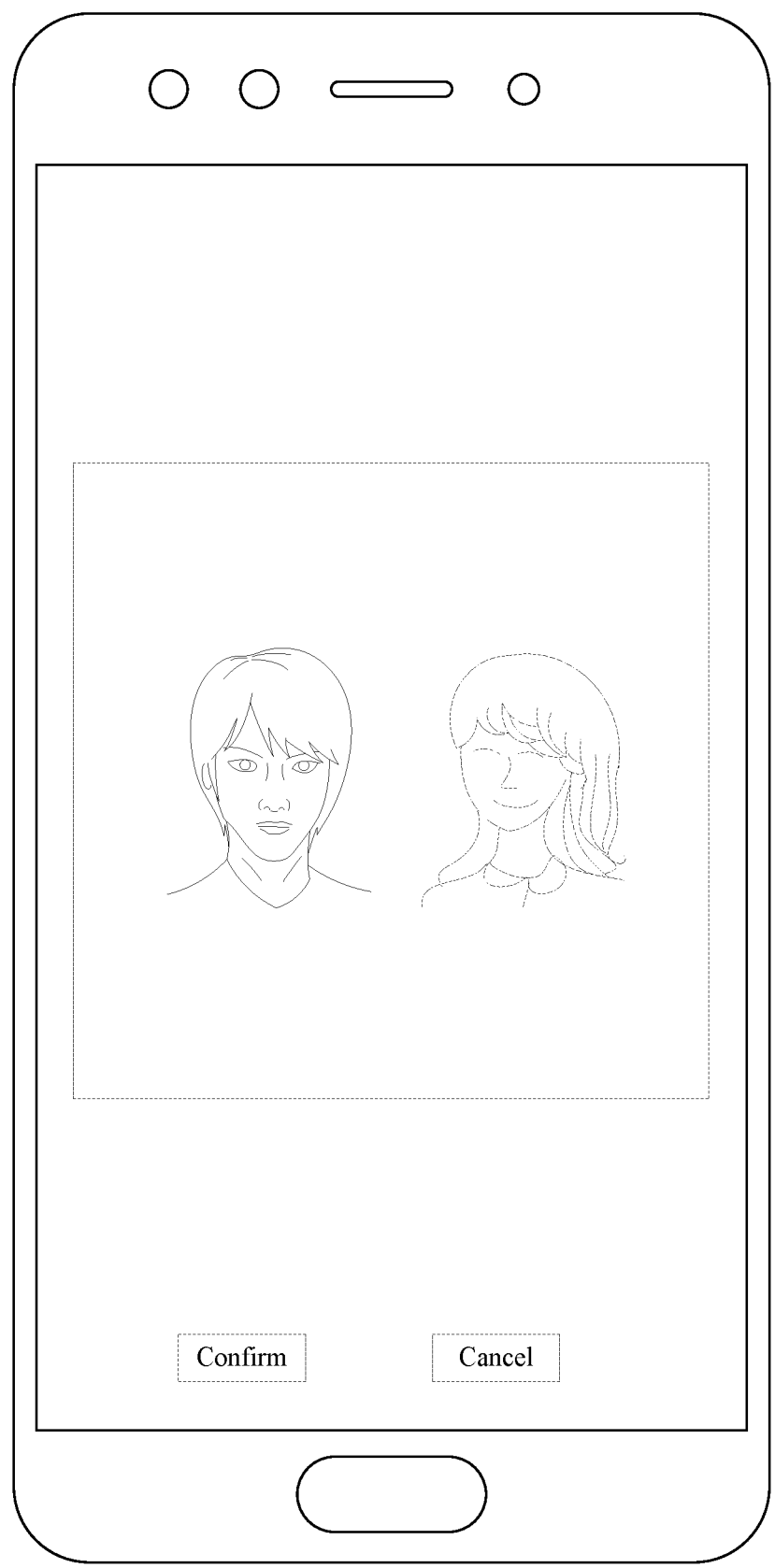
Figure 2F:
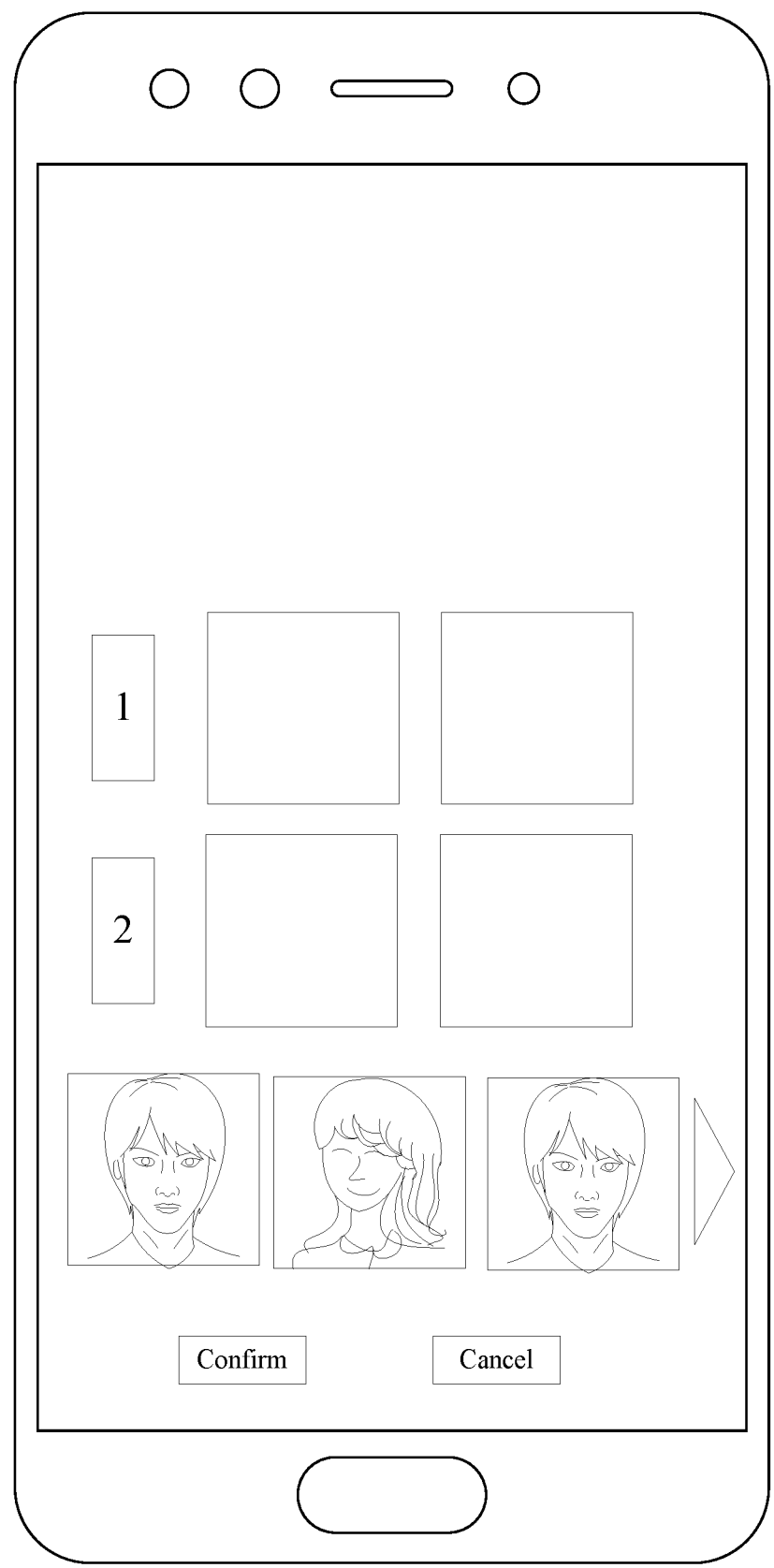

The user can also determine the $1^{st}$ input and the $2^{nd}$ input by dragging face images to different positions. As shown in FIG. 2f, blank boxes for placing of face images are displayed above the face images. The user can determine the face images by dragging the face images to the blank boxes in different groups. An operation of dragging a face image to a blank box corresponding to numeral 1 is the $1^{st}$ input. An operation of dragging a face image to a blank box corresponding to numeral 2 is the $2^{nd}$ input.

In addition, different selection inputs may alternatively be distinguished based on different durations of pressing face image areas.

In this embodiment, for the $i^{th}$ input, a corresponding identifier is displayed on each of the j face images or on preset side edges of the j face images. Input features and corresponding identifiers of different inputs are all different, which helps the user group the M face images to obtain a plurality of target images. In addition, the identifier corresponding to the $i^{th}$ input is displayed on each face image or on the preset side edges, which helps the user view face images included in a same group or different groups.

Step 202: In response to the first input, control a rotatable target camera to rotate and collect an image.

The target camera is a camera that can rotate by a preset angle. The preset angle may be set according to actual conditions. For example, the preset angle may be set to 180 degrees, 360 degrees, or the like.

Step 203: Perform facial recognition in a rotation process of the target camera.

In the rotation process of the target camera, the terminal performs facial recognition on a face collected by the target camera. When performing facial recognition, the terminal compares the collected face with a face in the M face images to determine whether the collected face matches the face in the M face images.

Step 204: Recognize a target person matching each of the M face images and shoot M sub-images.

In the rotation process of the target camera, the terminal performs facial recognition on the image collected by the target camera, and performs shooting when a face matching an image of the M face images is recognized.

In this embodiment, the target camera separately performs facial recognition based on an image of the M face images, and shoots an image when a target person matching the image of the M face images is recognized. The above operations are applied to each of the M face images, to obtain the M sub-images. The target camera performs M shooting operations. One sub-image is obtained via each shooting operation. Each sub-image includes one target person.

Step 205: Synthesize the M sub-images and output at least one target image that includes M target persons.

The M target persons may be included in one target image or in a plurality of target images. For example, in a case that there are four target persons, a first target image may include a first target person and a second target person; and a second target image may include a third target person and a fourth target person. Alternatively, a first target image may include a first target person, a second target person, and a third target person; and a second target image may include the third target person and a fourth target person.

The at least one target image that includes the M target persons is obtained by synthesizing the M sub-images. The foregoing process of obtaining a group photo of M target persons is simple to operate, which greatly improves efficiency of obtaining a synthesized image.

Step 204 and step 205 are a specific implementation of step 104.

According to the shooting method in this embodiment of the present disclosure, the first input performed by the user for the M face images is received; in response to the first input, the rotatable target camera is controlled to rotate and collect the image; facial recognition is performed in the rotation process of the target camera; the target person matching each of the M face images is recognized and M sub-images are shot; and the M sub-images are synthesized and the at least one target image that includes the M target persons is output. In this way, after determining the M face images based on the first input performed by the user, the terminal performs facial recognition on an image of the M face images and performs shooting, to obtain the M sub-images. In the entire process, the user needs only to determine the M face images via the first input, which simplifies the user's operation and improves the efficiency of taking a group photo.

Optionally, the performing facial recognition in a rotation process of the target camera includes:

in an $i^{th}$ rotation process of the target camera, performing, based on each face in the j face images, facial recognition on the image collected by the target camera; and the performing at least one shooting operation and outputting at least one target image that includes M target persons includes:

shooting one image once one target person matching one of the j face images is recognized, to obtain j images; and synthesizing the j images and outputting an $i^{th}$ target image that includes j target persons.

Specifically, in this embodiment, the target camera can rotate multiple times, and the terminal performs, based on the j face images determined via the $i^{th}$ input, facial recognition on the image collected by the target camera. Alternatively, in a first rotation process of the target camera, a target person matching a certain face image is not recognized. In this case, the target camera may continue to rotate for a preset quantity of times.

A one-time rotation angle of the target camera may range from 0 degrees to 180 degrees, or from 0 degrees to 360 degrees. In the rotation process of the target camera, facial recognition is performed on a collected face, to recognize a target person matching one of the j face images. In a case that the recognition is successful, a corresponding sub-image is obtained via shooting.

Then, when recognizing a target person matching one of the j face images, the target camera may also rotate multiple times, for example, twice. In a case that after the target camera rotates twice, but the target person matching a certain face image in the j face images is still not recognized, recognition is performed on the collected face based on a next group of face images. At the same time, prompt information may be displayed on the display interface.

Synthesize the j images and output an $i^{th}$ target image that includes j target persons.

In each rotation process of the target camera, the terminal recognizes, based on face images selected via a same input, the face collected by the target camera. For example, in the first rotation process of the target camera, the terminal recognizes, based on a face image selected via the $1^{st}$ input, the face collected by the target camera, shoots images, and then synthesizes the shot images. In a second rotation process of the target camera, the terminal recognizes, based on a face image selected via the $2^{nd}$ input, the face collected by the target camera, shoots images, and then synthesizes the shot images.

In this embodiment, the method includes: in an $i^{th}$ rotation process of the target camera, performing, based on each face in the j face images, facial recognition on the image collected by the target camera; shooting one image once one target person matching one of the j face images is recognized, to obtain j images; and synthesizing the j images and outputting an $i^{th}$ target image that includes j target persons. In each rotation process of the target camera, the terminal recognizes, based on face images selected via a same input, the face collected by the target camera, to obtain a target image, which reduces a quantity of shooting times in a single rotation process of the target camera. In addition, a target image can be obtained as soon as possible.

Optionally, the performing facial recognition in a rotation process of the target camera includes:
  in the rotation process of the target camera, performing, based on each of the M face images, facial recognition on the image collected by the camera; and
  the performing at least one shooting operation and outputting at least one target image that includes M target persons includes:
  shooting one image once one target person matching one of the M face images is recognized, to obtain M sub-images; and
  synthesizing the M sub-images and outputting the at least one target image that includes the M target persons.

In this embodiment, in the rotation process of the target camera, the terminal performs facial recognition on a collected face, to recognize a target person matching an image of the M face images. In a case that the recognition is successful, a sub-image that includes the target person is obtained via shooting.

The target camera may rotate once or multiple times, which can be specifically set according to actual conditions. A one-time rotation angle of the target camera may range from 0 degrees to 180 degrees, or from 0 degrees to 360 degrees. In this embodiment, in the rotation process of the target camera, the terminal may recognize the collected image based on any image in the M face images.

The target camera may rotate for a preset quantity of times, for example, twice. In a case that after the target camera rotates for the preset quantity of times, but a target person matching a certain image in the M face images is still not recognized, it is considered that a process of determining M sub-images based on the M face images fails, and prompt information is displayed on the display interface. Further, if it is determined that a sub-image corresponding to a first image of the M face images is not obtained, and the first image is determined via the $1^{st}$ input, a process of obtaining a target image based on a face image determined via the $1^{st}$ input fails, and prompt information is displayed on the display interface.

If sub-images corresponding to all images of the M face images are obtained in a case that the target camera has not rotated for the preset quantity of times, end a process of determining the M sub-images based on the M face images. In addition, the target camera may be restored to an initial position.

In this embodiment, the method includes: in the rotation process of the target camera, performing, based on each of the M face images, facial recognition on the image collected by the camera; shooting one image once one target person matching one of the M face images is recognized, to obtain M sub-images; and synthesizing the M sub-images and outputting the at least one target image that includes the M target persons. In the rotation process of the target camera, the terminal recognizes, based on the M face images, a face collected by the target camera. Therefore, in a single rotation process of the target camera, sub-images can be obtained as many as possible (provided that shooting is performed as long as a target person matching an image of the M face images is recognized), to reduce a quantity of rotation times of the target camera.

Optionally, the terminal includes N target cameras; the performing facial recognition in a rotation process of the target camera includes:
  determining a rotation range of each of the N target cameras based on pre-stored orientation information corresponding to each of the M face images; and
  controlling the N target cameras to rotate according to their respective rotation ranges, and in a rotation process of a $p^{th}$ target camera, performing, based on q face images, facial recognition on an image collected by the $p^{th}$ target camera; and
  the performing at least one shooting operation and outputting at least one target image that includes M target persons includes:
  shooting one image once one target person matching one of the q face images is recognized, to obtain q sub-images; and
  synthesizing the q sub-images and outputting at least one target image that includes q target persons, where
  N is a positive integer, p is a positive integer not greater than N, and q is a positive integer not greater than M.

In this embodiment, the terminal includes N target cameras. In a case that a face image of the M face images is obtained via the target camera of the terminal, orientation information of the face image is recorded while the face image is obtained. The orientation information may be a value of an angle by which the target camera rotates, or may be direction information. The direction information may be: a position on the left or right of a center point of a preview image obtained when the target camera is at the initial position. For example, in a case that the terminal includes a first target camera and a second target camera, and a first face image and a second face image are obtained via the first target camera. When the first target camera obtains the first face image, records show that the first face image is obtained when the camera rotates by 150 degrees and that the second face image is obtained when the camera rotates by 30 degrees. In this case, the orientation information is the value of the angle by which the first target camera rotates for obtaining the face images.

When obtaining the first face image, the first target camera rotates by 150 degrees. Because this rotation angle value is too large, the second target camera may be used to collect a target person matching the first face image. The second target camera starts to rotate in a direction opposite to the first target camera. Considering that the target person moves, a rotation range of the second target camera is determined to be 0 degrees to 60 degrees.

When obtaining the second face image, the first target camera rotates by 30 degrees. Therefore, considering that the target person moves, a rotation range of the first target camera is determined to be 0 degrees to 60 degrees.

The rotation range of each of the N target cameras is determined based on the pre-stored orientation information corresponding to each of the M face images. Therefore, the rotation range of the target camera can be optimized to reduce the rotation range of the target camera and improve efficiency of obtaining a sub-image.

In a rotation process of a $p^{th}$ target camera, one image is shot once one target person matching one of the q face images is recognized, to finally obtain q sub-images; and the terminal synthesizes the q sub-images and outputs at least one target image that includes q target persons.

Figure 2G:
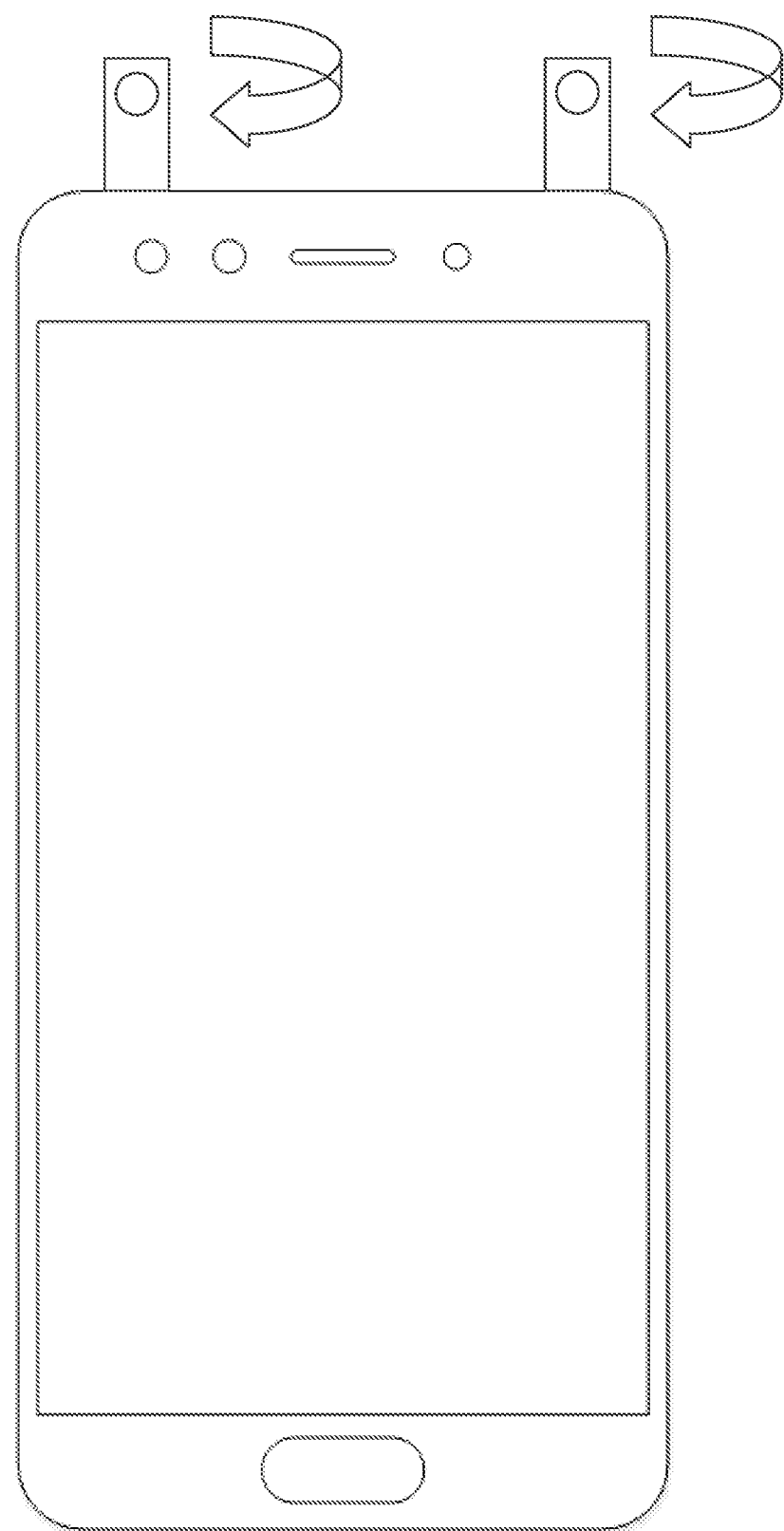

As shown in FIG. 2f, the user can determine face images of two double photos by dragging the face images to blank boxes in different groups. After the confirm button is clicked, the first target camera and the second target camera of the terminal protrude out separately, and start to rotate. As shown in FIG. 2g, a direction of an arrow in the figure is a rotation direction of the target camera. Two target cameras respectively find two target persons matching two face images in a same double photo, and perform shooting to obtain sub-images.

In this embodiment, the method includes: determining a rotation range of each of the N target cameras based on pre-stored orientation information corresponding to each of the M face images; controlling the N target cameras to rotate according to their respective rotation ranges, and in a rotation process of a $p^{th}$ target camera, performing, based on q face images, facial recognition on an image collected by the $p^{th}$ target camera; shooting one image once one target person matching one of the q face images is recognized, to obtain q sub-images; and synthesizing the q sub-images and outputting at least one target image that includes q target persons, where N is a positive integer, p is a positive integer not greater than N, and q is a positive integer not greater than M. The terminal uses N target cameras to obtain M shot images based on the M face images. Because the N target cameras work at the same time, efficiency of the terminal for obtaining a target image can be improved. In addition, because in the entire process, the user needs only to determine face images via the first input, the user's operation is simplified, and efficiency of taking a group photo is improved.

Optionally, the synthesizing the M sub-images and outputting the at least one target image that includes the M target persons includes:

determining a synthetic position of each of the M sub-images based on an order in which each of the M face images is selected or a display position of each of the M face images; and synthesizing the M sub-images based on the synthetic position of each sub-image, and outputting at least one target image.

Specifically, when image synthesis is performed on the M sub-images, the synthetic position of each of the M sub-images may be determined based on the order in which each of the M face images is selected. For example, in FIG. 2d, assuming that the user first selects an image on the left and then selects an image in the middle, before image synthesis, a sub-image determined based on the image on the left may be disposed on the left of a sub-image determined based on the image on the right. Then, image synthesis is performed to obtain the target image.

Alternatively, the synthetic position of each of the M sub-images may be determined based on the display position of each of the M face images. For example, in FIG. 2d, the image on the left and the image in the middle are selected via the $1^{st}$ input. Because the image on the left is displayed on the left of the image in the middle, before image synthesis, the sub-image determined based on the image on the left may be disposed on the left of the sub-image determined based on the image on the right. Then, image synthesis is performed to obtain the target image.

Finally, the target image is displayed on the display interface for viewing by the user. As shown in FIG. 2e which shows an obtained target image, in the target image, a target person matching the image on the left is disposed on the left of a target person matching the image on the right. The user can save the target image by clicking a confirm button, or return to a preview interface of the camera by clicking a cancel button.

In this embodiment, the method includes: determining a synthetic position of each of the M sub-images based on an order in which each of the M face images is selected or a display position of each of the M face images; and synthesizing the M sub-images based on the synthetic position of each sub-image, and outputting at least one target image. In this way, when a face image is selected, the user can determine a synthetic position of a sub-image corresponding to the face image, and does not need to additionally set a position of the sub-image. Therefore, the operation is simplified, and efficiency of obtaining the target image is improved.

Figure 3:
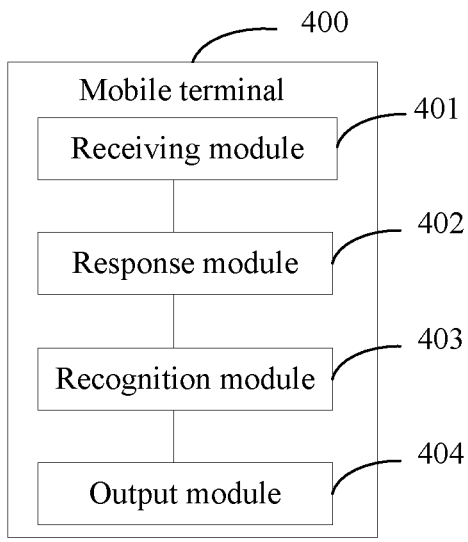
FIG. 3 is a structural diagram of a terminal according to an embodiment of the present disclosure.

FIG. 3 is a structural diagram of a terminal according to an embodiment of the present disclosure. Referring to FIG. 3, this embodiment provides a terminal 400, including:

a receiving module 401, configured to receive a first input performed by a user for M face images;

a response module 402, configured to: in response to the first input, control a rotatable target camera to rotate and collect an image;

a recognition module 403, configured to perform facial recognition in a rotation process of the target camera; and an output module 404, configured to perform at least one shooting operation and output at least one target image that includes M target persons, where each target person corresponds to one face image, and M is a positive integer greater than 1.

Optionally, the output module 404 includes:

a shooting sub-module, configured to recognize a target person matching each of the M face images and shoot M sub-images; and an output sub-module, configured to synthesize the M sub-images and output the at least one target image that includes the M target persons.

Optionally, the output sub-module is configured to:

determine a synthetic position of each of the M sub-images based on an order in which each of the M face images is selected or a display position of each of the M face images; and synthesize the M sub-images based on the synthetic position of each sub-image, and output at least one target image.

Optionally, the receiving module 401 is configured to:

receive I inputs performed by the user for the M face images, where an $i^{th}$ input is used to determine j face images, I is a positive integer, i is a positive integer not greater than I, and j is a positive integer greater than 1 and not greater than M.

Optionally, the terminal further includes:

a display module, configured to: for the $i^{th}$ input, display a corresponding identifier on each of the j face images or preset side edges of the j face images, where input features and corresponding identifiers of different inputs are all different.

Optionally, the recognition module 403 is configured to:

in an $i^{th}$ rotation process of the target camera, perform, based on each face in the j face images, facial recognition on the image collected by the camera; and the output module 404 is configured to:

shoot one image once one target person matching one of the j face images is recognized, to obtain j images; and synthesize the j images and output an $i^{th}$ target image that includes j target persons.

Optionally, the recognition module 403 is configured to:

in the rotation process of the target camera, perform, based on each of the M face images, facial recognition on the image collected by the camera; and the output module 404 is configured to:

shoot one image once one target person matching one of the M face images is recognized, to obtain M sub-images; and synthesize the M sub-images and output the at least one target image that includes the M target persons.

Optionally, the terminal 400 includes N target cameras;

the recognition module 403 includes:

a determining sub-module, configured to determine a rotation range of each of the N target cameras based on pre-stored orientation information corresponding to each of the M face images; and a recognition sub-module, configured to: control the N target cameras to rotate according to their respective rotation ranges, and in a rotation process of a $p^{th}$ target camera, perform, based on q face images, facial recognition on an image collected by the $p^{th}$ target camera; and the output module 404 is configured to:

shoot one image once one target person matching one of the q face images is recognized, to obtain q sub-images; and synthesize the q sub-images and output at least one target image that includes q target persons, where N is a positive integer, p is a positive integer not greater than N, and q is a positive integer not greater than M.

Optionally, the terminal further includes:

a recording module, configured to: in the rotation process of the target camera, shoot Q face images and record orientation information corresponding to each face image; and the receiving module 401 is configured to receive a first input performed by the user for a face image of the Q face images, where M is less than or equal to Q.

The terminal 400 can implement the processes implemented by the terminal in the method embodiments of FIG. 1 to FIG. 2. To avoid repetition, details are not described herein again.

The terminal 400 in this embodiment of the present disclosure receives a first input performed by a user for M face images; in response to the first input, controls the rotatable target camera to rotate and collect the image; performs facial recognition in the rotation process of the target camera; and performs the at least one shooting operation and outputs the at least one target image that includes the M target persons, where each target person corresponds to one face image, and M is a positive integer greater than 1. In this way, after determining the M face images based on the first input performed by the user, the terminal uses the target camera to perform facial recognition on the collected image and perform shooting, to obtain the at least one target image that includes the M target persons. In the entire process, the user needs only to determine the M face images via the first input, which simplifies the user's operation and improves efficiency of taking a group photo.

Figure 4:
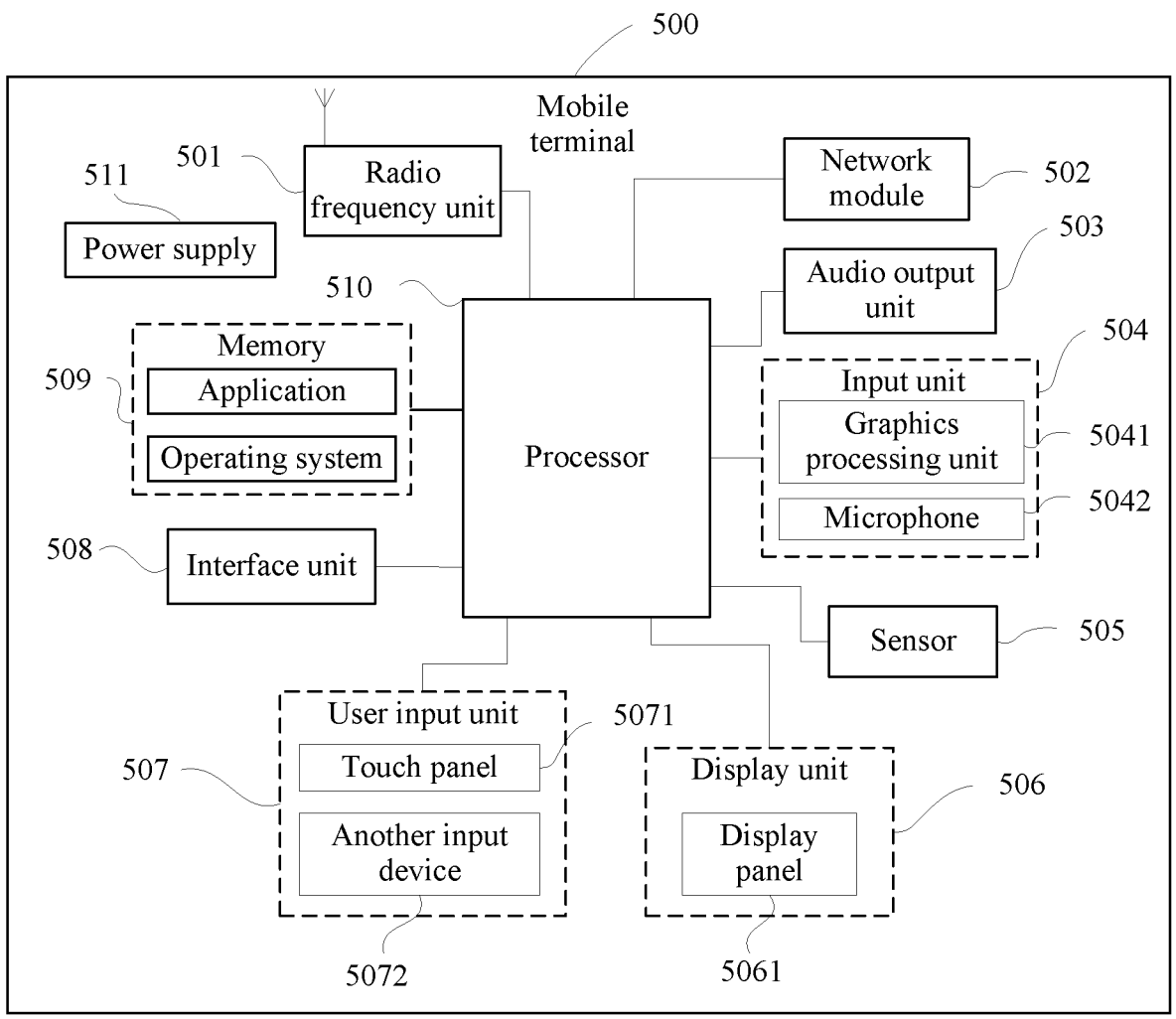
FIG. 4 is a structural diagram of a terminal according to another embodiment of the present disclosure.

FIG. 4 is a schematic structural diagram of hardware of a terminal according to the embodiments of the present disclosure. As shown in FIG. 4, the terminal 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. Those skilled in the art may understand that the terminal structure shown in FIG. 4 does not constitute a limitation to the terminal. The terminal may include more or fewer components than those shown in the figure, or some components may be combined, or there may be a different component arrangement. In the embodiments of the present disclosure, the terminal includes, but is not limited to, a mobile phone, a tablet computer, a notebook computer, a palmtop computer, a vehicle-mounted terminal, a wearable device, a pedometer, or the like.

The processor 510 is configured to: receive a first input performed by a user for M face images;

in response to the first input, control the rotatable target camera to rotate and collect the image;

perform facial recognition in the rotation process of the target camera; and perform the at least one shooting operation and output the at least one target image that includes the M target persons, where each target person corresponds to one face image, and M is a positive integer greater than 1.

Optionally, the processor 510 is configured to: recognize a target person matching each of the M face images and shoot M sub-images; and synthesize the M sub-images and output the at least one target image that includes the M target persons.

Optionally, the processor 510 is configured to: determine a synthetic position of each of the M sub-images based on an order in which each of the M face images is selected or a display position of each of the M face images; and synthesize the M sub-images based on the synthetic position of each sub-image, and output at least one target image.

Optionally, the processor 510 is configured to receive I inputs performed by the user for the M face images, where an $i^{th}$ input is used to determine j face images, I is a positive integer, i is a positive integer not greater than I, and j is a positive integer greater than 1 and not greater than M.

Optionally, the processor 510 is further configured to: for the $i^{th}$ input, display a corresponding identifier on each of the j face images or preset side edges of the j face images, where input features and corresponding identifiers of different inputs are all different.

Optionally, the processor 510 is configured to: in an $i^{th}$ rotation process of the target camera, perform, based on each face in the j face images, facial recognition on the image collected by the camera;

shoot one image once one target person matching one of the j face images is recognized, to obtain j images; and
synthesize the j images and output an $i^{th}$ target image that includes j target persons.

Optionally, the processor 510 is configured to: in the rotation process of the target camera, perform, based on each of the M face images, facial recognition on the image collected by the camera;
shoot one image once one target person matching one of the M face images is recognized, to obtain M sub-images; and
synthesize the M sub-images and output the at least one target image that includes the M target persons.

Optionally, the terminal includes N target cameras; and
the processor 510 is configured to: determine a rotation range of each of the N target cameras based on pre-stored orientation information corresponding to each of the M face images;
control the N target cameras to rotate according to their respective rotation ranges, and in a rotation process of a $p^{th}$ target camera, perform, based on q face images, facial recognition on an image collected by the $p^{th}$ target camera;
shoot one image once one target person matching one of the q face images is recognized, to obtain q sub-images; and
synthesize the q sub-images and output at least one target image that includes q target persons, where
N is a positive integer, p is a positive integer not greater than N, and q is a positive integer not greater than M.

Optionally, the processor 510 is further configured to: in the rotation process of the target camera, shoot Q face images and record orientation information corresponding to each face image; and
when receiving the first input performed by the user for the M face images, the processor 510 is specifically configured to:
receive a first input performed by the user for a face image of the Q face images, where
M is less than or equal to Q.

The terminal 500 can implement the processes implemented by the terminal in the foregoing embodiments. To avoid repetition, details are not described herein again.

The terminal 500 in this embodiment of the present disclosure receives a first input performed by a user for M face images; in response to the first input, controls the rotatable target camera to rotate and collect the image; performs facial recognition in the rotation process of the target camera; and performs the at least one shooting operation and outputs the at least one target image that includes the M target persons, where each target person corresponds to one face image, and M is a positive integer greater than 1. In this way, after determining the M face images based on the first input performed by the user, the terminal uses the target camera to perform facial recognition on the collected image and perform shooting, to obtain the at least one target image that includes the M target persons. In the entire process, the user needs only to determine the M face images via the first input, which simplifies the user's operation and improves efficiency of taking a group photo.

It should be understood that in this embodiment of the present disclosure, the radio frequency unit 501 may be configured to receive and send signals in a process of receiving and sending information or calling. Specifically, after receiving downlink data from a base station, the radio frequency unit 501 sends the downlink data to the processor 510 for processing; and sends uplink data to the base station. Generally, the radio frequency unit 501 includes, but is not limited to, an antenna, at least one amplifier, a transceiver, a coupler, a low noise amplifier, a duplexer, or the like. In addition, the radio frequency unit 501 may also communicate with a network and another device via a wireless communications system.

The terminal provides a user with wireless broadband Internet access by using the network module 502, for example, helping the user send and receive emails, browse web pages, and access streaming media.

The audio output unit 503 may convert audio data received by the radio frequency unit 501 or the network module 502 or stored in the memory 509 into an audio signal and output as sound. In addition, the audio output unit 503 may further provide audio output (for example, call signal receiving sound or message receiving sound) related to a specific function performed by the terminal 500. The audio output unit 503 includes a speaker, a buzzer, a telephone receiver, etc.

The input unit 504 is configured to receive an acoustic signal or a video signal. The input unit 504 may include a graphics processing unit (Graphics Processing Unit, GPU) 5041 and a microphone 5042. The graphics processing unit 5041 processes image data of a static picture or a video obtained by an image capture apparatus (for example, a rotatable camera) in an image capture mode or a video capture mode. A processed image frame may be displayed on the display unit 506. The image frame processed by the graphics processing unit 5041 can be stored in the memory 509 (or another storage medium) or sent via the radio frequency unit 501 or the network module 502. The microphone 5042 may receive sound and can process such sound into audio data. The processed audio data may be converted in a call mode into a format that can be sent by the radio frequency unit 501 to a mobile communication base station for outputting.

The terminal 500 further includes at least one sensor 505, for example, a light sensor, a motion sensor, and another sensor. Specifically, the light sensor includes an ambient light sensor and a proximity sensor. The ambient light sensor can adjust brightness of a display panel 5061 based on brightness of ambient light. The proximity sensor can turn off the display panel 5061 and/or backlight when the terminal 500 is moved towards an ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 505 may further include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information entered by the user or information provided for the user. The display unit 506 may include a display panel 5061, and the display panel 5061 may be configured in a form of liquid crystal display (Liquid Crystal Display, LCD), organic light-emitting diode (Organic Light-Emitting Diode, OLED), or the like.

The user input unit 507 may be configured to: receive input digit or character information, and generate key signal input related to user setting and function control of the terminal. Specifically, the user input unit 507 includes a touch panel 5071 and another input device 5072. The touch panel 5071 is also referred to as a touchscreen, and may collect a touch operation performed by the user on or near the touch panel 5071 (for example, an operation performed on or near the touch panel 5071 by the user by using any appropriate object or accessory such as a finger or a stylus). The touch panel 5071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, and sends the touch point coordinates to the processor 510, and can receive and execute a command sent by the processor 510. In addition, the touch panel 5071 may be implemented by using a plurality of types such as a resistive type, a capacitive type, an infrared ray, and a surface acoustic wave. The user input unit 507 may further include another input device 5072 in addition to the touch panel 5071. Specifically, the another input device 5072 may include, but is not limited to, a physical keyboard, function keys (for example, a volume control key and an on/off key), a trackball, a mouse, or a joystick. Details are not described herein.

Further, the touch panel 5071 may cover the display panel 5061. When detecting the touch operation on or near the touch panel 5071, the touch panel 5071 transmits the touch operation to the processor 510 to determine a type of a touch event, and then the processor 510 provides corresponding visual output on the display panel 5061 based on the type of the touch event. Although in FIG. 4, the touch panel 5071 and the display panel 5061 are used as two independent components to implement input and output functions of the terminal, in some embodiments, the touch panel 5071 and the display panel 5061 can be integrated to implement the input and output functions of the terminal. Details are not limited herein.

The interface unit 508 is an interface for connecting an external apparatus to the terminal 500. For example, the external apparatus may include a wired or wireless headset port, an external power supply (or battery charger) port, a wired or wireless data port, a storage card port, a port configured to connect to an apparatus having a recognition module, an audio input/output (I/O) port, a video I/O port, a headset port, and the like. The interface unit 508 may be configured to receive an input (for example, data information or power) from an external apparatus and transmit the received input to one or more elements in the terminal 500, or transmit data between the terminal 500 and the external apparatus.

The memory 509 may be configured to store a software program and various data. The memory 509 may mainly include a program storage area and a data storage area. The program storage area may store an operating system, an application for at least one function (for example, a sound play function or an image play function), and the like. The data storage area may store data (for example, audio data or an address book) or the like created based on use of the mobile phone. In addition, the memory 509 may include a high-speed random access memory, or may include a non-volatile memory, for example, at least one disk storage device, a flash memory, or another volatile solid-state storage device.

The processor 510 is a control center of the terminal, and connects all parts of the entire terminal through various interfaces and lines. By running or executing a software program and/or a module stored in the memory 509 and invoking data stored in the memory 509, the processor 510 performs various functions of the terminal and data processing, to perform overall monitoring on the terminal. The processor 510 can include one or more processing units. Preferably, the processor 510 can be integrated with an application processor and a modem processor. The application processor mainly processes the operating system, the user interface, applications, etc. The modem processor mainly processes wireless communication. It can be understood that, alternatively, the modem processor may not be integrated into the processor 510.

The terminal 500 may further include the power supply 511 (such as a battery) that supplies power to each component. Preferably, the power supply 511 may be logically connected to the processor 510 by using a power management system, so as to implement functions such as charging, discharging, and power consumption management by using the power management system.

In addition, the terminal 500 includes some function modules that are not shown. Details are not described herein.

Optionally, an embodiment of the present disclosure further provides a terminal, including a processor 510, a memory 509, and a computer program stored in the memory 509 and executable on the processor 510. When executed by the processor 510, the computer program implements the foregoing processes of the shooting method embodiment, and a same technical effect can be achieved. To avoid repetition, details are not described herein again.

An embodiment of the present disclosure further provides a computer-readable storage medium. The computer-readable storage medium stores a computer program, and when executing the computer program, a processor implements the foregoing processes of the shooting method embodiment and a same technical effect can be achieved. To avoid repetition, details are not described herein again. The computer-readable storage medium is, for example, a read-only memory (Read-Only Memory, ROM for short), a random access memory (Random Access Memory, RAM for short), a magnetic disk, or an optical disc.

It should be noted that, in this specification, the terms "include", "comprise", or any of their variants are intended to cover a non-exclusive inclusion, such that a process, a method, an article, or an apparatus that includes a list of elements not only includes those elements, but also includes other elements that are not expressly listed, or further includes elements inherent to such a process, method, article, or apparatus. In the absence of more restrictions, an element defined by the statement "including a . . . " does not exclude another same element in a process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A shooting method, applied to a terminal and comprising:
   receiving a first input performed by a user for M face images;
   in response to the first input, controlling a rotatable target camera to rotate and collect an image;
   performing facial recognition in a rotation process of the target camera; and
   performing at least one shooting operation and outputting at least one target image that comprises M target persons, wherein each target person corresponds to one face image, and
   M is a positive integer greater than 1,
   wherein the receiving a first input performed by a user for M face images comprises:
   receiving I inputs performed by the user for the M face images, wherein
   an $i^{th}$ input is used to determine i face images, I is a positive integer, i is a positive integer not greater than I, and j is a positive integer greater than 1 and not greater than M,
   wherein the performing facial recognition in a rotation process of the target camera comprises:
   in an $i^{th}$ rotation process of the target camera, performing, based on each face in the i face images, facial recognition on the image collected by the camera; and
   the performing at least one shooting operation and outputting at least one target image that comprises M target persons comprises:
   shooting one image once one target person matching one of the i face images is recognized. to obtain j images; and
   synthesizing the j images and outputting an $i^{th}$ target image that comprises j target persons, or
   wherein the performing facial recognition in a rotation process of the target camera comprises:
   in the rotation process of the target camera, performing, based on each of the M face images, facial recognition on the image collected by the camera; and
   the performing at least one shooting operation and outputting at least one target image that comprises M target persons comprises:
   shooting one image once one target person matching one of the M face images is recognized, to obtain M sub-images; and
   synthesizing the M sub-images and outputting the at least one target image that comprises the M target persons.

2. The method according to claim 1, wherein the performing at least one shooting operation and outputting at least one target image that comprises M target persons comprises:
   recognizing a target person matching each of the M face images and shooting M sub-images; and
   synthesizing the M sub-images and outputting the at least one target image that comprises the M target persons.

3. The method according to claim 2, wherein the synthesizing the M sub-images and outputting the at least one target image that comprises the M target persons comprises:
   determining a synthetic position of each of the M sub-images based on an order in which each of the M face images is selected or a display position of each of the M face images; and
   synthesizing the M sub-images based on the synthetic position of each sub-image, and outputting at least one target image.

4. The method according to claim 1, wherein after the receiving I inputs performed by the user for the M face images, the method further comprises: for the $i^{th}$ input, displaying a corresponding identifier on each of the j face images or preset side edges of the j face images, wherein input features and corresponding identifiers of different inputs are all different.

5. The method according to claim 1, wherein the terminal comprises N target cameras;
   the performing facial recognition in a rotation process of the target camera comprises:
   determining a rotation range of each of the N target cameras based on pre-stored orientation information corresponding to each of the M face images; and
   controlling the N target cameras to rotate according to their respective rotation ranges, and in a rotation process of a $p^{th}$ target camera, performing, based on q face images, facial recognition on an image collected by the $p^{th}$ target camera; and
   the performing at least one shooting operation and outputting at least one target image that comprises M target persons comprises:
   shooting one image once one target person matching one of the q face images is recognized, to obtain q sub-images; and
   synthesizing the q sub-images and outputting at least one target image that comprises q target persons, wherein
   N is a positive integer, p is a positive integer not greater than N, and q is a positive integer not greater than M.

6. The method according to claim 1, wherein before the receiving a first input performed by a user for M face images, the method further comprises:
   in the rotation process of the target camera, shooting Q face images and recording orientation information corresponding to each face image; and
   the receiving a first input performed by a user for M face images comprises:
   receiving a first input performed by the user for a face image of the Q face images, wherein
   M is less than or equal to Q.

7. A terminal, comprising a processor, a memory, and a computer program stored in the memory and executable on the processor, wherein when executed by the processor, the computer program implements the steps of a shooting method, wherein the method comprises:
   receiving a first input performed by a user for M face images;
   in response to the first input, controlling a rotatable target camera to rotate and collect an image;
   performing facial recognition in a rotation process of the target camera; and
   performing at least one shooting operation and outputting at least one target image that comprises M target persons, wherein each target person corresponds to one face image, and
   M is a positive integer greater than 1, wherein the receiving a first input performed by a user for M face images comprises:
receiving I inputs performed by the user for the M face images, wherein
an $i^{th}$ input is used to determine j face images, I is a positive integer, i is a positive integer not greater than I, and j is a positive integer greater than 1 and not greater than M,
wherein the performing facial recognition in a rotation process of the target camera comprises:
in an $i^{th}$ rotation process of the target camera, performing, based on each face in the j face images, facial recognition on the image collected by the camera; and
the performing at least one shooting operation and outputting at least one target image that comprises M target persons comprises:
shooting one image once one target person matching one of the j face images is recognized, to obtain j images; and
synthesizing the j images and outputting an $i^{th}$ target image that comprises j target persons. or
wherein the performing facial recognition in a rotation process of the target camera comprises:
in the rotation process of the target camera, performing, based on each of the M face images, facial recognition on the image collected by the camera; and
the performing at least one shooting operation and outputting at least one target image that comprises M target persons comprises:
shooting one image once one target person matching one of the M face images is recognized, to obtain M sub-images; and
synthesizing the M sub-images and outputting the at least one target image that comprises the M target persons.

8. The terminal according to claim 7, wherein the performing at least one shooting operation and outputting at least one target image that comprises M target persons comprises:
recognizing a target person matching each of the M face images and shooting M sub-images; and
synthesizing the M sub-images and outputting the at least one target image that comprises the M target persons.

9. The terminal according to claim 8, wherein the synthesizing the M sub-images and outputting the at least one target image that comprises the M target persons comprises:
determining a synthetic position of each of the M sub-images based on an order in which each of the M face images is selected or a display position of each of the M face images; and
synthesizing the M sub-images based on the synthetic position of each sub-image, and outputting at least one target image.

10. The terminal according to claim 7, wherein after the receiving I inputs performed by the user for the M face images, the method further comprises: for the $i''$ input, displaying a corresponding identifier on each of the j face images or preset side edges of the j face images, wherein input features and corresponding identifiers of different inputs are all different.

11. The terminal according to claim 7, wherein the terminal comprises N target cameras;
the performing facial recognition in a rotation process of the target camera comprises:
determining a rotation range of each of the N target cameras based on pre-stored orientation information corresponding to each of the M face images; and
controlling the N target cameras to rotate according to their respective rotation ranges, and in a rotation process of a $p^{th}$ target camera, performing, based on q face images, facial recognition on an image collected by the $p^{th}$ target camera; and
the performing at least one shooting operation and outputting at least one target image that comprises M target persons comprises:
shooting one image once one target person matching one of the q face images is recognized, to obtain q sub-images; and
synthesizing the q sub-images and outputting at least one target image that comprises q target persons, wherein N is a positive integer, p is a positive integer not greater than N, and q is a positive integer not greater than M.

12. The terminal according to claim 7, wherein before the receiving a first input performed by a user for M face images, the method further comprises:
in the rotation process of the target camera, shooting Q face images and recording orientation information corresponding to each face image; and
the receiving a first input performed by a user for M face images comprises:
receiving a first input performed by the user for a face image of the Q face images, wherein M is less than or equal to Q.

13. A non-transitory computer-readable storage medium, wherein the computer-readable storage medium stores a computer program, and when executed by a processor, the computer program implements the steps of a shooting method, wherein the method comprises:
receiving a first input performed by a user for M face images;
in response to the first input, controlling a rotatable target camera to rotate and collect an image;
performing facial recognition in a rotation process of the target camera; and
performing at least one shooting operation and outputting at least one target image that comprises M target persons, wherein each target person corresponds to one face image, and
M is a positive integer greater than 1,
wherein the receiving a first input performed by a user for M face images comprises:
receiving I inputs performed by the user for the M face images, wherein
an ith input is used to determine j face images, I is a positive integer, i is a positive integer not greater than I, and j is a positive integer greater than 1 and not greater than M,
wherein the performing facial recognition in a rotation process of the target camera comprises:
in an ith rotation process of the target camera, performing, based on each face in the j face images, facial recognition on the image collected by the camera; and
the performing at least one shooting operation and outputting at least one target image that comprises M target persons comprises:
shooting one image once one target person matching one of the j face images is recognized. to obtain j images; and
synthesizing the j images and outputting an ith target image that comprises j target persons, or
wherein the performing facial recognition in a rotation process of the target camera comprises:

in the rotation process of the target camera, performing, based on each of the M face images, facial recognition on the image collected by the camera; and the performing at least one shooting operation and outputting at least one target image that comprises M target persons comprises:

shooting one image once one target person matching one of the M face images is recognized, to obtain M sub-images; and synthesizing the M sub-images and outputting the at least one target image that comprises the M target persons.

14. The non-transitory computer-readable storage medium according to claim 13, wherein the performing at least one shooting operation and outputting at least one target image that comprises M target persons comprises:

recognizing a target person matching each of the M face images and shooting M sub-images; and synthesizing the M sub-images and outputting the at least one target image that comprises the M target persons.

* * * * *